Sept. 26, 1961 E. C. YEATON ET AL 3,002,152

ELECTRONIC SIGNAL GENERATOR

Filed Feb. 25, 1955 2 Sheets-Sheet 1

Edward C. Yeaton
Hans C. Neumann
INVENTORS

BY H. D. O'Brien
Q. B. Warner
ATTORNEYS

ELECTRONIC SIGNAL GENERATOR

Filed Feb. 25, 1955 2 Sheets-Sheet 2

Edward C. Yeaton
Hans C. Neumann
INVENTORS

BY G. D. O'Brien
Q. B. Warner
ATTORNEYS

United States Patent Office 3,002,152

Patented Sept. 26, 1961

3,002,152
ELECTRONIC SIGNAL GENERATOR

Edward C. Yeaton and Hans C. Neumann, Rochester, N.Y., assignors, by mesne assignments, to the United States of America as represented by the Secretary of the Navy Filed Feb. 25, 1955, Ser. No. 490,704
5 Claims. (Cl. 328—62)

This invention relates to an electronic signal generator for cyclically generating a series of individually controllable pulses at a predetermined repetition frequency.

It is frequently desirable, in testing electronic components of guided missiles, etc., to be able to simulate, as closely as possible, the actual waveforms which would be applied to the input of the electronic equipment under actual operating conditions.

It is an object of this invention to provide a signal generator which is capable of producing a repeating series of four generally triangular signal pulses, each of which is individually adjustable, both as to the rise-time and the decay-time of the pulse, and each of which closely simulates the natural response of a thermal detector to a brief exposure to heat. Provision is also made for adjusting the amplitudes of each individual pulse in the series and, when desired, for eliminating any one, or more, of the pulses from the series appearing in the output.

A further object is to provide an electronic signal generator which is extremely flexible and which is, by proper adjustment of the components, usable over a relatively wide range of frequencies to produce output signals having a considerable variation in waveform.

Other objects and advantages will become apparent from the following description, especially when considered in the light of the accompanying drawing wherein.

Figure 1:
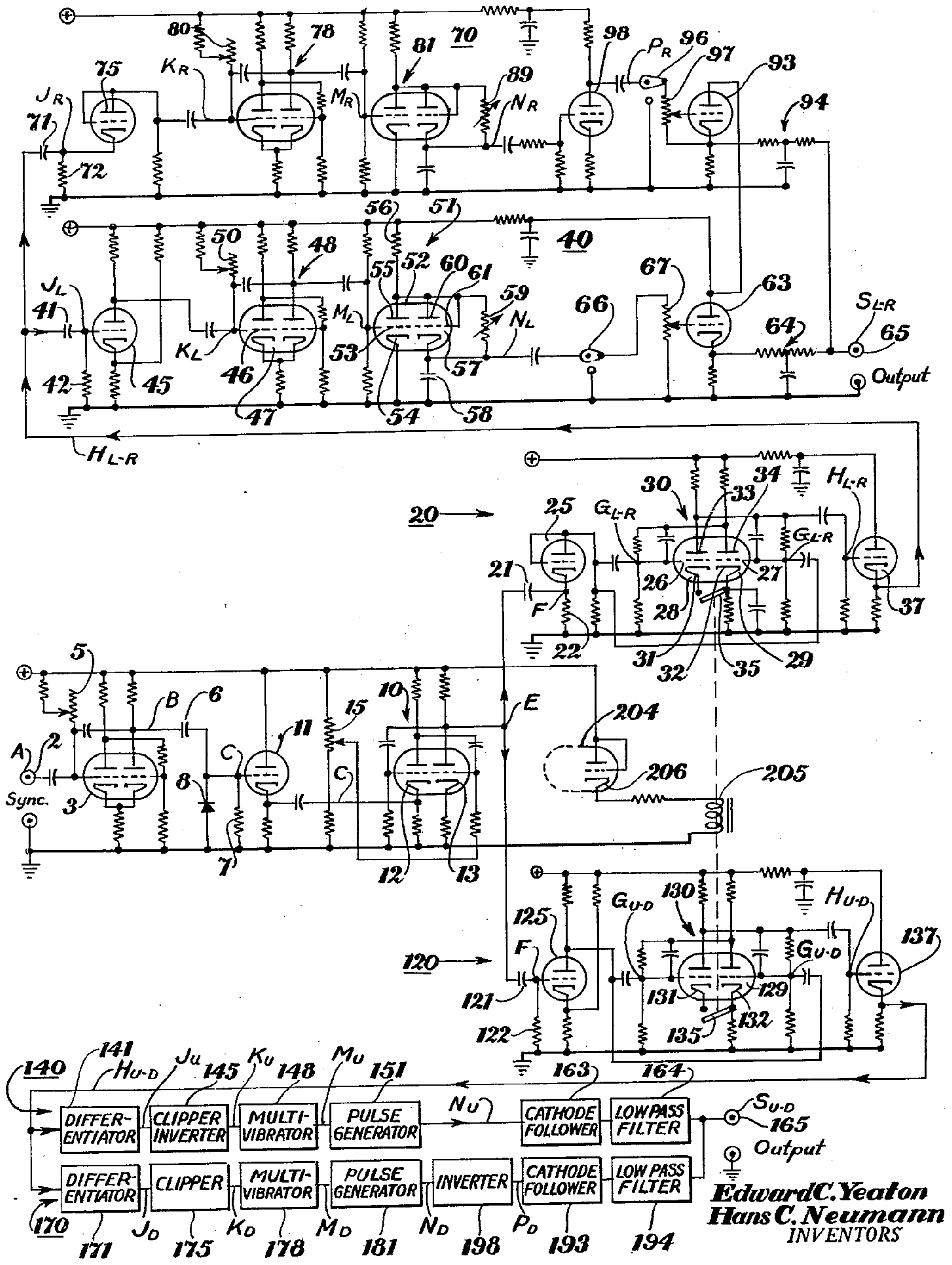
FIG. 1 is a schematic diagram of the signal generator.

In the following description it will be assumed that four output signals, corresponding respectively to Left, Right, Up, and Down signals, are to be sequentially generated at a repetition frequency of, for example, 10 cycles per second. Each of the individual output signals will be spaced one-quarter cycle from the preceding signal and the signals will be produced in the order of Right, Down, Left, and Up. To this end, a master oscillator 10 is provided, operating at a frequency double the repetition frequency of the output signals. This master oscillator, in turn, serves to control the generation of two sets of square waves, one in the Left-Right channel and the other in the Up-Down channel, the two square waves being of the repetition frequency and being 90° out of phase with one another. The positive-going portions of each of these square waves serves to control the generation of a signal pulse corresponding to one direction, while the negative-going portion serves to control the generation of the signal pulse corresponding to the opposite direction. While the master oscillator can be used entirely independently of any synchronizing signals, it is frequently desirable to provide means for bringing it into desired phase relationship with external synchronizing pulses. Such a system is shown in FIG. 1.

Synchronizing pulses 1, occurring at twice the repetition frequency of the output signal pulses, are applied as at A to the input terminals 2 so as to trigger a dual triode 3 connected as a monostable multivibrator with its individual triode sections interconnected so that the left-hand section is normally heavily conducting. The negative-going sync pulses trigger this multivibrator so that it will produce at its output B a negative-going rectangular output pulse 4, the duration of which is controllable by adjustment of the adjustable resistor 5. This rectangular pulse 4 is differentiated by means of a condenser 6 and resistor 7, the negative-going peaks in the differentiated signal being clipped by rectifier 8 so as to produce a series of positive-going delayed sync pulses 9 at point C. These delayed sync pulses are applied to the input of the master oscillator 10 through a suitable cathode follower 11.

The master oscillator 10 comprises twin triode sections 12 and 13 connected as a free-running multivibrator adapted to produce a square wave 14 at its output E. The frequency of the square waves is adjustable by means of a potentiometer 15 which, in the assumed case, will be adjusted to provide a 20-cycle square wave output from the oscillator. As is well known, as long as 20-cycle sync pulses are present, the oscillator will tend to "lock in" with the sync pulses, or, more correctly, with the delayed sync pulses 9, so that each voltage change will occur at a definite interval after the sync pulses 1.

The output from the oscillator 10 is applied to the input of each of two separate channels 20 and 120, one for controlling the Left-Right signals and the other, the Up-Down signals. Considering first the Left-Right channel, the square wave is differentiated by condenser 21 and resistor 22 to produce sharp, negative and positive pulses 23, 24 at the point F. The positive peaks 24 are clipped by the rectifier 25 and the negative peaks 23 appearing at $G_{L\text{-}R}$ are applied to the control grids 26 and 27 of a pair of triode sections 28 and 29 connected as a bistable multivibrator 30. Each triode section includes its individual cathode 31, 32 and anode 33, 34. Connected in series with cathode 31 of the left-hand section 28, is a normally open relay contact 35 which, as herein later described, serves to insure starting of the multivibrator in the proper phase relationship. The output from the multivibrator 30 at point $H_{L\text{-}R}$ will be in the form of a square wave 36 at the repetition frequency of 10 cycles per second. This square wave 36 is applied through a suitable cathode follower 37 to the inputs of the Left signal generator branch channel 40 and the Right signal generator branch channel 70.

Considering first, Left channel 40, the square wave 36 is differentiated by means of condenser 41 and resistor 42 to produce negative and positive output pulses 43 and 44 at point $J_L$. These pulses are applied to the control grid of a triode 45 which is biased to cut off so that only the positive-going pulses 44 will affect the plate current flow through the tube 45, these pulses producing inverted pulses 44' at the output $K_L$ of the triode 45. Pulses 44' are applied to the trigger control grid 46 of a dual triode 47 connected to constitute a monostable multivibrator 48, which thereby produces at its output $M_L$ a series of negative-going rectangular control pulses 49, the duration of which will depend upon the adjustment of the adjustable resistor 50. These pulses 49 initiate the operation of a signal pulse generator 51 which includes a triode section 52 having a control grid 53, cathode 54 and anode 55, the cathode being grounded and the anode being connected to a source of high voltage through a plate resistor 56. A rectifier 57 and condenser 58 are connected in series between the anode 55 and ground and an adjustable resistor 59 is connected in parallel with the rectifier. Triode 52 and rectifier 57 may conveniently be sections of a dual triode tube, with the anode 60 and grid 61 of one section connected together to constitute the rectifier anode.

A signal generator of this type combined with a rectangular pulse generator such as the generator 48 provides a relatively simple means for generating a generally triangular output pulse at the point $N_L$, in which both the rise time and the decay time can be individually adjusted. In operation, the triode section 52 is normally heavily conducting so that the voltage at its anode is relatively low. Under these conditions, condenser 58 will assume a voltage equal to that at the anode, since a direct current path exists through the resistor 59. When the negative control pulse appears at the grid 53 of the triode, the tube is cut off and the voltage at its anode tends to rise to the supply potential. Condenser 58 thereupon begins to charge through resistor 56 and the diode section 57 (which will now be conductive due to the fact that a higher voltage exists on its plate 60 than on its cathode).

The relative values of resistor 56 and condenser 58 are so chosen that their time constant is appreciably greater than the maximum length of control pulse that it is expected to be applied to the grid 53. Thus, the condenser will continue to charge at a substantially constant rate so long as the control pulse is present. Since the output signal is taken across this condenser, the rise time of the output signal will accordingly correspond to the duration of the rectangular control pulse and may be varied at will by adjustment of resistor 50 in the control pulse generator circuit. At the end of the control pulse, triode 52 again becomes conducting so that its plate voltage will immediately fall below the voltage appearing at the upper side of the condenser 58. Rectifier 57 will, therefore, be inoperative and the condenser 58 will immediately begin to discharge exponentially through resistor 59 and triode section 52 to ground, the rate of discharge being dependent upon the adjustment of resistor 59. Obviously, by varying the adjustment of resistor 59, the decay time of the output wave can be varied to a considerable extent.

It is assumed herein that the resistors 50 and 59 have been so adjusted as to produce, at point $N_L$, a series of generally triangular signal pulses 62, in which the decay time is approximately three times the duration of the rise time. However, as above mentioned, either the rise time, the decay time, or both, could be readily varied over rather wide limits. The generally triangular pulses 62 are applied through a suitable cathode follower 63 to a low-pass filter network 64 and thence to the output terminal 65. Low-pass filter network 64 is for the purpose of attenuating the high-frequency components in the original pulse 62 and thereby rounding off the rather abrupt changes in potential occurring at the beginning and at the peak of the signal pulse. The final waveform of the Left signal pulse L is shown at $S_{L-R}$ in FIG. 3, and closely simulates the response of a thermal detector to a brief exposure to heat.

A switch 66 is inserted between the signal generator and the cathode follower for the purpose of permitting grounding of the Left pulse when it is desired to eliminate this pulse from the series. Resistor 67 in the grid circuit of the cathode follower 63 may be adjusted to regulate the amplitude of the Left pulse as it appears at the output 65.

As previously mentioned, the square wave 36 is also applied to the Right channel 70. As in the Left channel, this square wave is differentiated by condenser 71 and resistor 72 and the differentiated signal is passed through a clipper 75. Since, in this case, it is desired to use the negative pulses, rather than the positive pulses, appearing at the output of the differentiating means, clipper 75 is in the form of a rectifier which serves to block the positive pulses and to pass the negative pulses on to the control pulse generator 78. This generator 78 is exactly like the generator 48 in the Left channel and includes a corresponding resistor 80 for controlling the duration of the control pulses at its output "$M_R$." The output pulses, in turn, are applied to a signal generator 81, corresponding to generator 51 previously described, and likewise including a variable resistor 89 for controlling the decay time of the right signal pulse. Since it is desired in the particular unit under discussion, to provide the Left and Right output signals at a common output terminal and to have the Right pulses inverted relative to the Left pulses, a triode inverter 98 is inserted between the Right signal generator 81 and the cathode follower 93 of this channel. The inverted pulse 92′ appearing at $P_R$ is, in turn, applied through a low-pass filter 94 to the output terminal 65. The final waveform of the Right signal pulse R is shown at $S_{L-R}$ in FIG. 3, being combined at the output terminal with the Left signal pulse L to produce the desired Left-Right signal output. As was the case in the Left channel, a switch 96 is provided for selectively rendering inactive the Right channel, and an adjustable resistor 97 is provided for controlling the amplitude of the Right output signals.

Figure 3:
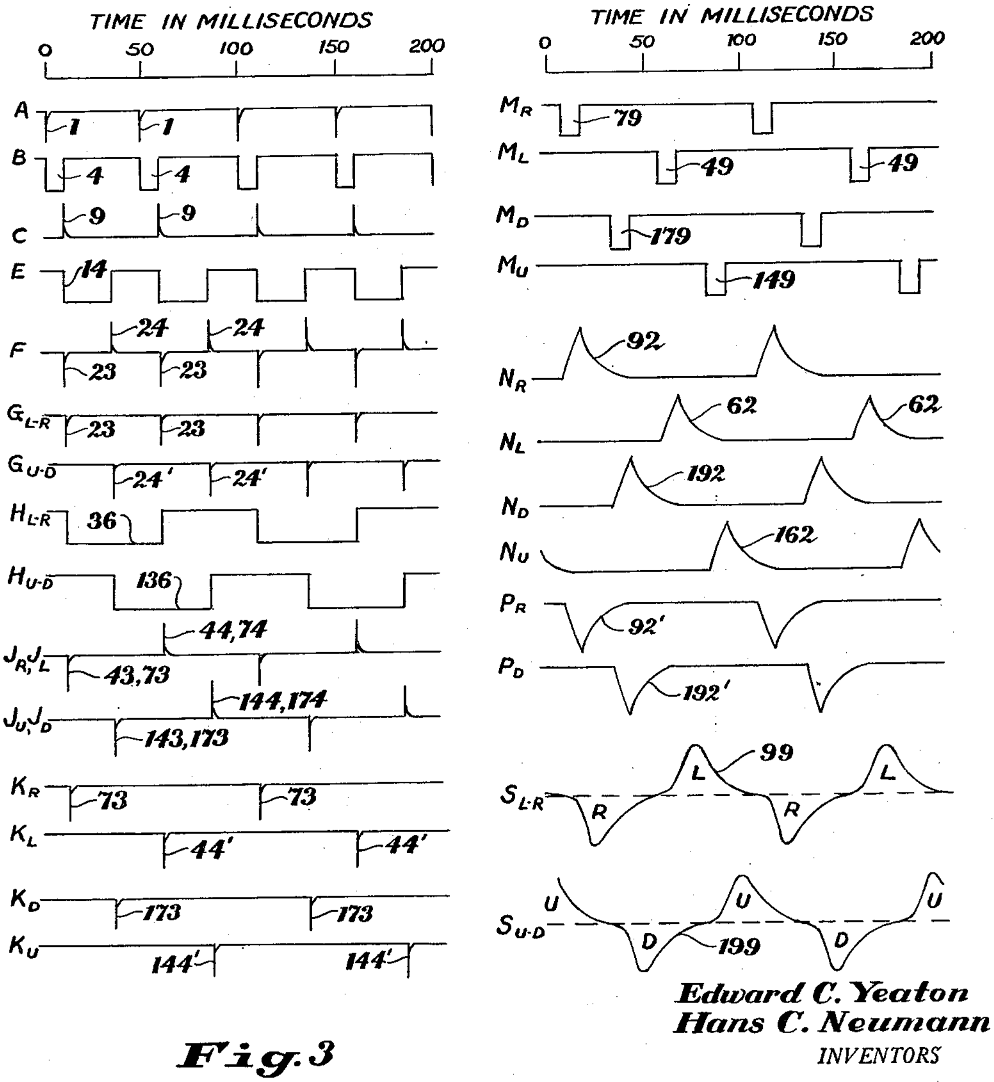
FIG. 3 is a graphical representation of the waveforms existing at various points in the signal generator shown in FIG. 1.

Returning to the Up-Down channel 120, it can be readily seen that except for the use of a triode 125, acting as a clipper-inverter, in place of the corresponding diode 25 used in Left-Right channel 20, Up-Down channel 120 and its Up and Down branch channels 140 and 170 correspond exactly to the similar portions of channels 20, 40 and 70. The clipper-inverter 125, which is a triode normally biased to cut off, serves to clip the negative pulses appearing at the output of the differentiating circuit 121 and 122 and to pass and invert the positive pulses which correspond to the positive-going portions of the square wave 14 appearing at the output of the master oscillator 10. Thus, the inverted pulses 24′, which determine the relative phase of the multivibrator 130, are delayed one-quarter of a complete repetition cycle with respect to the corresponding pulses 23 used to control the Left-Right channel. Since the remaining components and their operation are identical to those of the corresponding Left-Right channels, no detailed description thereof will be given. In each case, the components in the Up-Down channel and in its Up-and-Down branches are given reference numerals which are 100 greater than the corresponding components in the Left-Right channels. The waveforms appearing at designated points in the Up-Down channel are shown in FIG. 3. The output from the Up-Down channel appearing at output terminals 165 will be in the form of a series of generally triangular output pulses "U" and "D" of relatively opposite polarity, as shown at 199 in FIG. 3. By comparing the time sequence of the pulses R and L formed by the wave 99 at the output 65 of the Left-Right channel, it can be seen that the four pulses will occur in the sequence R, D, L, and U, the sequence repeating every tenth of a second.

Figure 2:
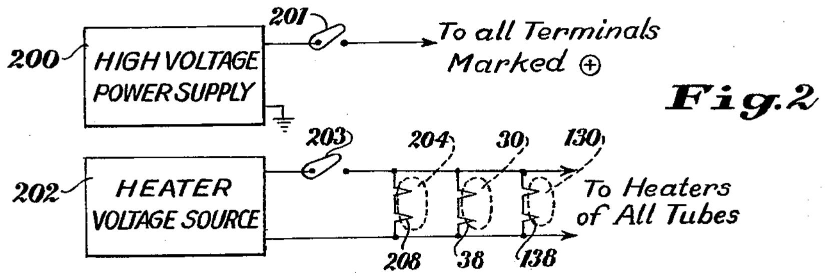
FIG. 2 is a schematic diagram of the voltage supply for the signal generator of FIG. 1.

The power supply for use with the signal generator of FIG. 1 is diagrammatically illustrated in FIG. 2 and comprises a high voltage power supply 200 which is adapted to apply high voltage to the plus terminals shown in FIG. 1. A suitable control switch 201 may be provided to control the application of this high voltage. In accordance with the usual practice, the various vacuum tubes used in the signal generator are preferably of the indirectly-heated-cathode type. To avoid confusion, the heaters themselves have not been shown in FIG. 1. However, as shown in FIG. 2, the heaters are connected in parallel across a heater voltage source 202 which, likewise, is provided with a control switch 203.

Since two bistable multivibrators are used, one to control each of the Left-Right and Up-Down channels, it is necessary to insure that, upon application of the supply voltages, the multivibrators will start up in proper phase relationship. To insure this result, a control tube 204 is provided for the purpose of energizing the coil 205 of a delay relay connected in series with its cathode 206. Tube 204 should have the same cathode heating characteristics as do the tubes used for the multivibrators 30 and 130 and preferably will be of the same type. For example, one section of a dual triode type 12AU7, with its grid and plate connected together to form a diode, may be used as the control tube 204 while two other 12AU7 type tubes will provide both sections of the multivibrators 30 and 130. The heaters 38, 138 and 208 for these tubes, are shown in FIG. 2. With this arrangement, if the heater control switch 203 is closed after the application of high voltage to the signal generator, the cathodes 31, 32, 131, 132 and 206 will all come up to operating temperature at substantially the same time. Thus, by the time that sufficient cathode current is flowing through tube 204 to energize relay 205, the right-hand sections 29 and 129 of the multivibrators 30 and 130 will be conducting. The resulting low voltage occurring at the anodes of these sections will cause a correspondingly low voltage at the grids of the left-hand sections of these tubes. Thus, by the time the relay points 35 and 135, which are closed upon energization of the relay 205, close to complete the connection to the cathodes 31 and 131 of the left-hand multivibrator sections, these sections will already be blocked by the low voltage occurring on their grids.

The same result will obtain if the high voltage switch 201 is closed after the cathodes have been brought up to operating temperature since the slight time delay involved in the operation of the relay points 35 and 135 by the relay 205, will suffice to insure that the right-hand sections are conducting before the circuit is completed to the left-hand sections.

It is believed that the operation of this signal generator will already be clear from the above description and need not be repeated here.

By adjustment of resistor 5, the duration of the negative-going pulses 4 at the output of the monostable multivibrator 3 may be varied to control the time delay between the sync pulses 1 and the delayed sync pulses 9, so that the square wave 14, at the output of the master oscillator 10, will have any desired phase relationship relative to the sync pulses. Proper phasing of the multivibrators 30 and 130, which respectively control the relative timing of the Left-Right and Up-Down pulses, is then automatically and positively obtained by controlling one of these multivibrators in response to the positive pulses obtained by differentiating the square wave from the master oscillator 10 and the other by the negative pulses obtained from such differentiation. The 180° phase difference between the generation of the Left and Right or the Up and Down pulses is similarly obtained by selection of the appropriate positive or negative pulse obtained by differentiating the square wave outputs of the multivibrators 30 and 130. The rise time of any one of the signal pulses may be individually adjusted by proper adjustment of the appropriate resistor 50, 80, etc., and likewise the decay time of any one or more of the pulses can be individually adjusted. Any or all of the individual signal pulses may be eliminated from the train of pulses appearing at the output terminals 65 and 165 and the amplitudes of each of the pulses can also be individually adjusted. From the above it is believed obvious that the objects of the invention have been fully attained.

While specific circuits have been shown for the various differentiators, clippers, multivibrators, etc., it will be obvious to those skilled in the art that any known type of corresponding element may be substituted without affecting the operation of the device and without departing from the spirit and scope of the invention as defined by the appended claims.

It is obvious, of course, that by varying the settings of the pulse rise and decay time potentiometers, the actual shape of the output pulse may be varied quite widely from the specific form illustrated at 99 and 199 in FIG. 3. However, regardless of the particular settings used at any time, each pulse will have the generally linear rise, the rounded peak, and the exponential decay, which are characteristic of the response of a thermal detector to a relatively brief exposure to heat.

What we claim is:

1. A signal generator for cyclically generating a series of individually controllable signal pulses in predetermined order and at a predetermined repetition frequency, comprising means for electronically generating a square wave of a frequency equal to twice said repetition frequency, a pair of bistable electronic multivibrators, differentiating means connecting said multivibrators to the output of said square wave generating means whereby one of said multivibrators will be triggered in response to positive-going portions only of said square wave and the other multivibrator will be triggered in response to negative-going portions only of said square wave, said multivibrators thereby producing a pair of square waves in relative phase quadrature relationship at said predetermined repetition frequency, two pairs of control pulse generators, additional differentiating means connecting one pair of control pulse generators to each of said multivibrators whereby one control pulse generator of each pair will be triggered in response to positive-going excursions only, and the other control pulse generator will be triggered in response to negative-going excursions only, in the square wave output from the associated multivibrator, each of said control pulse generators being individually adjustable to regulate the length of the control pulses therefrom, individual signal pulse generators connected to and controlled by each of said control pulse generators, each of said signal pulse generators being operative while the associated control pulse is present to continuously vary its output voltage in one direction from an initial value and, at the termination of the control pulse, to return its output voltage to said initial value, and each of said signal pulse generators including means for individually controlling the rate at which its output voltage returns to said initial value.

2. A pulse generator for generating a voltage pulse of generally triangular waveform, comprising an electronic tube having at least an anode, a cathode and a control electrode, means including a plate resistor connected to the anode of said tube for applying a positive potential between the anode and cathode whereby said tube is normally conducting, a condenser and a rectifier connected in series between said anode and cathode, said rectifier having its anode connected directly to the anode of said tube and said condenser being connected directly between the cathode of said rectifier and the cathode of said tube, a resistor connected directly in parallel with said rectifier, and trigger pulse generating means for driving said control element negative relative to said cathode for rendering said tube non-conducting to cause charging of said condenser.

3. A pulse generator according to claim 2 wherein said last-mentioned resistor is adjustable in value for controlling the decay time of the voltage across the condenser after termination of said trigger pulse.

4. A pulse generator according to claim 2 wherein said triggering means includes means for controlling the duration of said trigger pulse and thereby the rise time of the voltage across the condenser.

5. A pulse generator according to claim 4 wherein said last-mentioned resistor is adjustable in value for controlling the decay time of the voltage across the condenser after termination of said trigger pulse.

References Cited in the file of this patent

UNITED STATES PATENTS

| | | |
|---|---|---|
| 2,073,701 | Lazzarini | Mar. 16, 1937 |
| 2,348,016 | Michel | May 2, 1944 |
| 2,405,930 | Goldberg et al. | Aug. 13, 1946 |
| 2,416,320 | Jeanne | Feb. 25, 1947 |
| 2,551,595 | Grieg | May 8, 1951 |
| 2,557,086 | Fisk et al. | June 19, 1951 |